J. SCHALK, Jr.
Self-Measuring Oil-Tanks.
No. 139,084. Patented May 20, 1873.
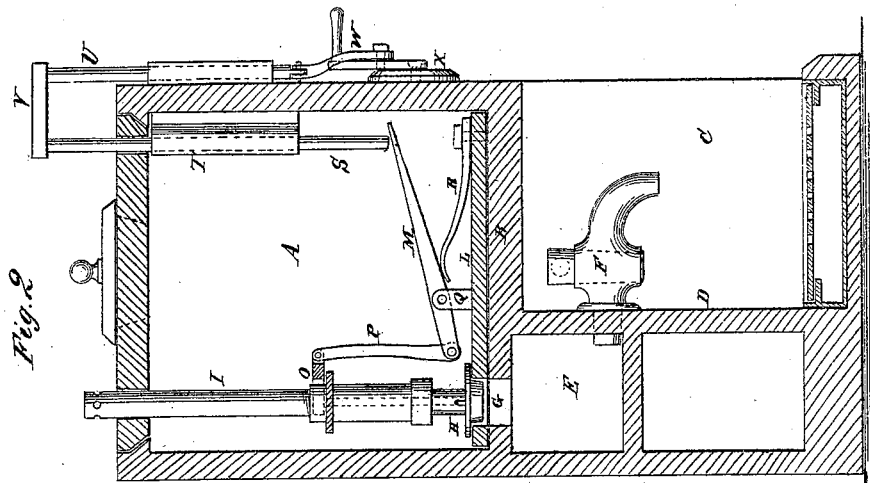
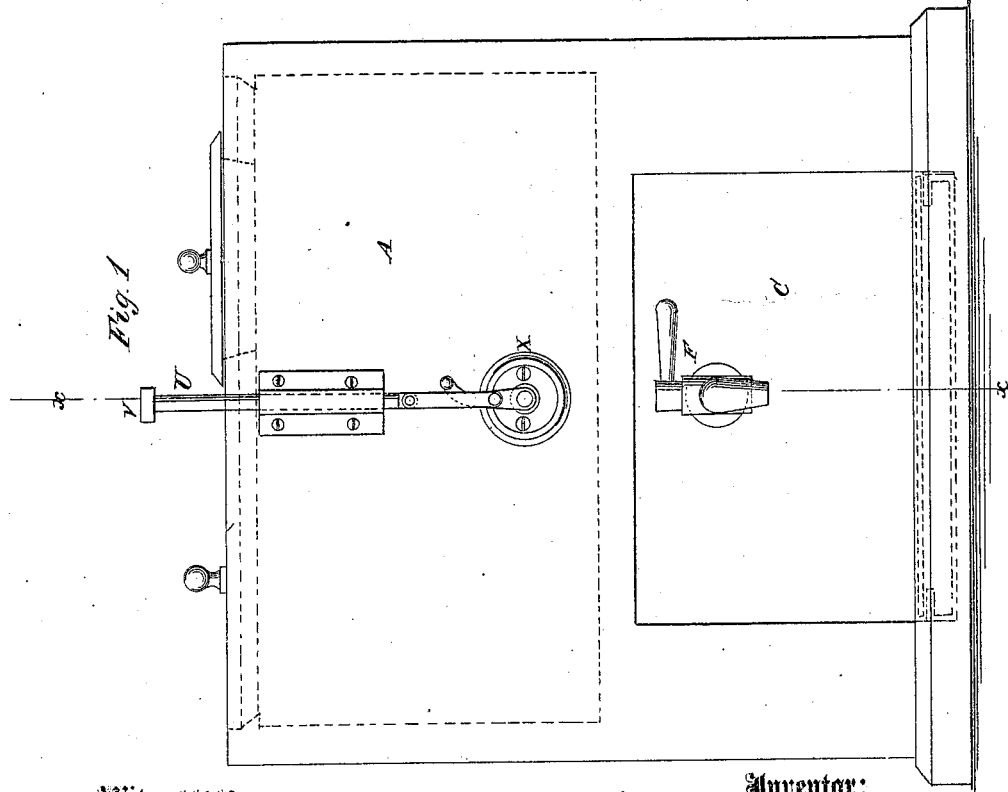
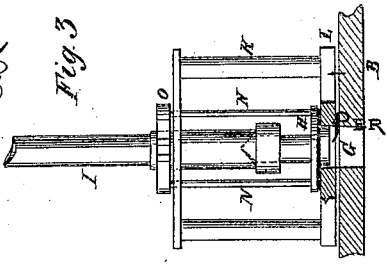

UNITED STATES PATENT OFFICE.

JACOB SCHALK, JR., OF GUTTENBERG, NEW JERSEY.

IMPROVEMENT IN SELF-MEASURING OIL-TANKS.

Specification forming part of Letters Patent No. 139,084, dated May 20, 1873; application filed January 6, 1873.

*To all whom it may concern:*

Be it known that I, JACOB SCHALK, Jr., of Guttenberg, in the county of Hudson and State of New Jersey, have invented a new and useful Improvement in Self-Measuring Kerosene-Tank, of which the following is a specification:

The invention consists in the improvement of self-measuring oil-tanks, as hereinafter described and pointed out in the claim.

In the drawing, Figure 1 is a front elevation. Fig. 2 is a vertical section of Fig. 1 taken on the line $xx$. Fig. 3 is a detail showing the arrangement of the valve.

Similar letters of reference indicate corresponding parts.

A is the tank; A', a receptacle for the oil, which may be made to contain a barrel or so of liquid. B is the bottom of the tank. Beneath the bottom is an open space, C, where the liquid is delivered. D is the back of the open space. E represents one of a series of measuring-compartments, varying in size from one pint to one gallon. F is a delivery-faucet for each compartment E. These measuring-compartments are filled from the tank A, through the valve-orifice G. (See Fig. 2.) H is a valve by which this orifice is closed. I is an air-tube, which extends up through the top of the tank, with its lower end J raised from the bottom of the tank. This tube is supported in this position by the frame K, the bed-plate L of which frame rests upon the bottom of the tank and forms the seat of the valve. The valve is operated by means of the lever M. N N are two rods attached to the valve, which pass up through the top of the frame K. The upper ends are connected by a curved collar, O, with which the lever is connected by the rod P. Q is the fulcrum-stand of the lever. R is a spring attached to the bed-plate L, which bears up against the lever with a constant pressure, and thus keeps the valve-orifice closed. When the valve is raised for allowing the liquid to run into the compartment E, it is raised up against the lower end of the air-tube I. There is a conical plug attached to the top of the valve, which fits a conical seat in the air-tube, and prevents the air from entering the tank and the liquid from entering the tubes. The lever is operated by means of a plunger, S, which presses down through the top of the tank, guided by the stationary flanged tube T, which is attached to the inside of the tank. The plunger is connected with the outside rod U by the pin V. The rod U is connected with the crank W. The crank turns on a central pivot in the plate X, so that by a partial revolution of crank the valve is raised to discharge the liquid and to close the air-tube. The back motion of the valve, which stops the flow of the liquid, is produced by the spring R before mentioned.

The compartments E, more or less in number, may be filled from the tank in any convenient manner by means of a tube or tubes, or the liquid may be discharged into one compartment and run from that into the others. When any one of the compartments is emptied or drawn off, the valve may be raised to fill it, so that they may all be kept full and ready at all times. By this arrangement the exact quantity required is always measured out and ready for being drawn off, and may be drawn into measuring-vessels or directly into the vessel of the customer. In the bottom of the opening is a drip-pan, the cover of which is perforated, as seen in Fig. 2.

The tank is made preferably of wood lined with metal, and presents a neat and handsome appearance. By its use the disagreeable and dangerous operation of handling kerosene or retailing it to customers is rendered pleasant and safe.

Having thus described my invention, I claim as new and desire to secure by Letters Patent—

The crank W, reciprocating frame U V T, and lever mechanism R M P O, arranged in connection with the receptacle and valve mechanism, as and for the purpose specified.

JACOB SCHALK, JR.

Witnesses:
T. B. MOSHER,
C. SEDGWICK.